Figure 1:
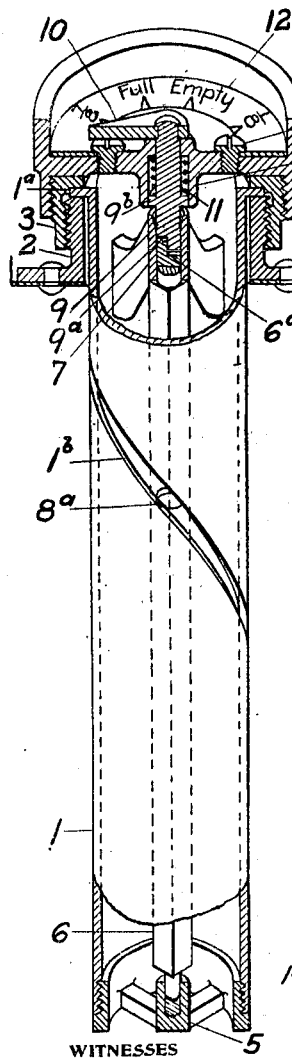

H. HASTINGS.
FLUID GAGE.
APPLICATION FILED DEC. 21, 1908.

1,039,280.

Patented Sept. 24, 1912.

WITNESSES
Leonard D. Hall.
Harry L. Thompson.

INVENTOR
Herbert Hastings

UNITED STATES PATENT OFFICE.

HERBERT HASTINGS, OF ROCHESTER, NEW YORK.

FLUID-GAGE.

1,039,280.  Specification of Letters Patent.  Patented Sept. 24, 1912.

Application filed December 21, 1908. Serial No. 468,539.

*To all whom it may concern:*

Be it known that I, HERBERT HASTINGS, a citizen of the United States, residing at Rochester, in the county of Monroe and State of New York, have invented a new and useful Fluid-Gage, of which the following is a specification.

My invention relates to improvements in fluid gages for constantly showing the depth or amount of fluid in a tank or receptacle, such for example as are commonly used for gasolene, oil and water on automobiles, motor boats, etc., and the objects of my improvements are, first, to provide a gage that can be permanently mounted in the filler opening of tanks without changing or altering either the opening or any part of the tank; second, to accomplish this without interfering with the use of this filler opening as the means for filling the tank; third, to provide a filler opening cap or closure with means for indicating the amount of fluid in the tank; fourth, to construct a fluid gage that at the same time may be used as the filling tube or opening of a tank and mounted in any convenient place either directly in the tank or removed from it and connected to it by a tube or pipe. These objects in the spirit of the invention, might be attained in a number of different arrangements and combinations of parts. I prefer to show however the construction illustrated in the drawing, in which—

Figure 4:
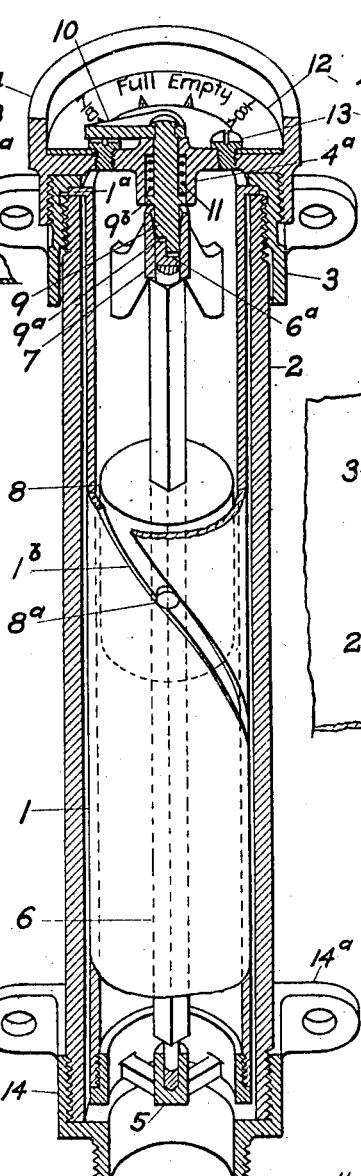
Figure 3:
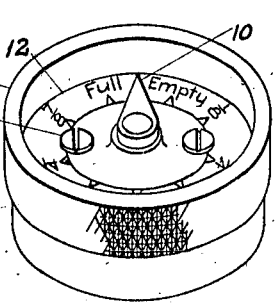
Figure 2:
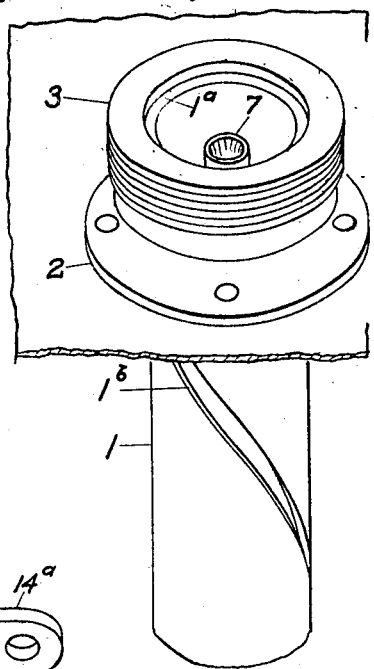

Figure 1 is a partial section through the center in perspective showing the gage as mounted in the filler hole of a tank, with the cap screwed on and the top of the tank indicated as broken away. Fig. 2 is a broken perspective showing the gage attached to the filler hole collar or flange of a tank with the cap removed. Fig. 3 shows the cap removed from the gage. Fig. 4 shows in section the gage complete for mounting outside the tank with provision for attaching it to a pipe or tube to connect it with the tank.

Like numbers refer to like parts in the different views.

1 is the gage tube which is flanged at its upper end at $1^a$, this flange rests on top of the filler hole collar or flange 2 to which it is firmly clamped by the threaded flange collar 3 and to this collar is threaded the cap or closure 4. In the lower end of tube 1 is secured the bearing 5 for the lower end of the float rod 6, the upper end of which is guided in bearing 7 which is secured near the upper end of said tube. The float rod 6 may be square or rectangular in section with reduced cylindrical portions at its lower and upper ends and upon which it is free to turn under the influence of the float 8 through the center of which the square portion of the rod passes; as the float is caused to rise or fall by the change of level of the fluid in the tank, the projection $8^a$ which engages the spiral slot $1^b$ in tube 1 causes the float to turn proportionately to this rise or fall and the turning motion of the float is transferred to the swivel rod 6, the upper end of this rod is flattened at $6^a$ and this portion engages the lower end of the indicator stem 9 which is similarly flattened at $9^a$, this stem is rotatably and slidably mounted in the central hub $4^a$ of cap 4 and carries at its upper end the indicator pointer 10 and intermediately it has an enlarged portion or shoulder $9^b$ against which a spiral spring 11 presses and retains it in its downward position. As cap 4 is unscrewed for removing, the indicator stem is free to turn in the cap otherwise it would have a tendency to turn the float rod, in replacing the cap if the flattened portion $9^a$ of the indicator stem is not in position to engage the flattened portion $6^a$ of the float rod as the ends come in contact the spring 11 allows the indicator stem to rise in the cap until the turning of the cap in screwing it on brings the flats in alinement and the spring then forces it down in place in engagement with the float rod.

In assembling this gage in a tank it is necessary that the "Full" and "Empty" graduations of the indicator scale 12 correspond with the positions of the indicator pointer at the extreme upward and extreme downward position respectively of the float and to easily accomplish this after assembling I provide an indicator scale adjustably mounted on the cap 4 and when adjusted is held in the desired positions by screws 13.

In Fig. 4 the gage is shown as if the filler hole collar or flange 2 in Fig. 1 and Fig. 2 extended from end to end completely inclosing tube 1 and threaded at its lower end to receive the end closure 14 which is also threaded to provide a connection with the tank and also has integral wing portions $14^a$ as has also the upper threaded flange collar 3 to provide means for fastening in a vertical position in any convenient place with bottom of the gage level with the bottom of the tank.

I am aware that prior to my invention fluid gages have been made that are attached to tanks through a special opening, also that they have been made with detachable caps and that they have been made for mounting exterior of the tank. I therefore do not claim the latter two combinations broadly but—

I claim—

1. In a fluid gage a float, an indicator controlling member actuated thereby, a guide adapted to turn said float as it rises or falls, means for suspending said guide in the filling opening of a tank, a removable closure for said opening, an indicator movably supported thereon and means for causing said indicator to automatically interengage said indicator controlling member as said closure is applied.

2. In a fluid gage a float, a collar having a filling opening, a float guide supported thereby and adapted to turn the float as the float rises and falls, a revolving member adapted to be turned by the float, a closure for said filling opening, an indicator carried by said closure and means whereby said indicator interengages said revolving member as the closure is applied to said opening.

3. In a fluid gage the combination with a fluid receptacle provided with a filling opening, a float, a float guide supported in the filling opening and provided with means for turning the float as it rises and falls, an oscillating member turned by the float, a closure for said opening provided with an indicator and means for causing the indicator to interengage the oscillating member as the closure is applied to the opening.

4. In a fluid gage a float, a body portion adapted to guide and to turn said float as it rises and falls, an open center suspending means for said body portion, a rocking member adapted to be turned by the float, a closure for said open center, an indicator carried by the closure and means whereby the indicator always engages the rocking member in the same relation one to the other as the closure is applied.

5. In a fluid gage a fluid receptacle provided with a filling aperture, a pivoted member, a float, a guide coacting with the float to turn said pivoted member, a removable closure for said aperture and means mounted on said closure for indicating the position of the float by contacting in one position with said pivoted member when said closure is in position.

6. In a fluid gage the combination with an oscillatory member, a float, a member provided with a filling opening and with means coacting with the float to turn the oscillatory member, a removable closure for said opening and an indicator thereon provided with means for engaging the oscillatory member in a predetermined relation as the closure is placed in position.

7. In a fluid gage a fluid holder provided with a filling passage, a rocking member, a float, means for converting the vertical movement of said float into angular movement of said rocking member, a closure for said passage independently removable from said rocking member and means carried by said closure for positively engaging said rocking member as the closure is applied to the filling passage to indicate the position of the float.

8. In a fluid gage a float, a guide adapted to turn said float, means provided with a filling-opening for suspending said guide, a removable cap for said opening, a shaft adapted to be turned by said float, an indicator mounted on said cap provided with means for engaging said shaft after disengagement as the cap is applied so that said shaft and said indicator always maintain the same position relative to each other.

9. In a fluid gage, in combination fluid level measuring means within a receptacle provided with a filling opening, a removable closure for said opening provided with indicating means, and means for engaging said measuring means and said indicating means in a predetermined relative position as the closure is applied.

10. In a fluid gage in combination a float, a hollow guide adapted to impart angular movement to said float, a revoluble member adapted to be turned by said float, a removable cap for said guide, indicating means carried by said cap and means acting as the cap is applied for engaging said indicating means and revoluble member in only one relative angular position.

HERBERT HASTINGS.

Witnesses:
 MILTON NOYES,
 LEONARD I. HALL.